United States Patent

Hättich et al.

Patent Number: 5,308,393
Date of Patent: May 3, 1994

[54] AQUEOUS RELEASE AGENT AND THE USE THEREOF

[76] Inventors: Thomas Hättich, Hauselgasse 39, 6900 Heidelberg; Gerhard Schuster, Pachelbelstr. 56, Nuremberg, both of Fed. Rep. of Germany

[21] Appl. No.: 935,659

[22] Filed: Aug. 26, 1992

Related U.S. Application Data

[63] Continuation of Ser. No. 711,884, Jun. 7, 1991, abandoned.

[30] Foreign Application Priority Data

Jun. 7, 1990 [EP] European Pat. Off. ........ 90110797.9

[51] Int. Cl.$^5$ .................. C09D 191/00; C09D 191/06
[52] U.S. Cl. ........................ 106/38.22; 106/38.24; 106/38.25; 106/243; 106/244; 106/271; 252/34; 252/33; 252/49.5; 252/117; 252/120
[58] Field of Search ................ 106/38.24, 38.25, 243, 106/244, 271, 287.25, 38.22; 252/34, 49.5, 33, 117, 120

[56] References Cited

U.S. PATENT DOCUMENTS

| | | | |
|---|---|---|---|
| 2,500,122 | 3/1950 | Dixon et al. | 106/244 |
| 3,964,915 | 6/1976 | Doenges et al. | 106/268 |
| 4,783,296 | 11/1988 | Fischer et al. | 269/51 |
| 4,892,585 | 1/1990 | Fischer et al. | 106/38.22 |
| 4,969,952 | 11/1990 | Hattich et al. | 106/38.24 |

FOREIGN PATENT DOCUMENTS

| | | |
|---|---|---|
| 0223233 | 5/1987 | European Pat. Off. . |
| 0272629 | 6/1988 | European Pat. Off. . |

OTHER PUBLICATIONS

Hoechst, Fettamine Und Folgeprodukte; pp. 5–29, cover pages and back pages (Dec. 1986).
Hoechst, Fettamine Und Folgeprodukte; Jan. 1980.
Hiemenz, *Principles of Colloid and Surface Chemistry*, Marcel Deklear, Inc., New York, 1986.

*Primary Examiner*—David Brunsman
*Attorney, Agent, or Firm*—Cushman, Darby & Cushman

[57] ABSTRACT

A novel aqueous release agent is described which contains as release-active substances oil, fat, wax, fatty amines and/or esters of fatty acids with fatty alcohols emulsified in water as the carrier and a specific emulsifier system, which consists of a blend of neutralized cationic quaternary ammonium compounds and anionic soaps. Surprisingly the system does not flocculate despite the opposite charge of the two emulsifier components and leads to a more flexible, elastic and pressure restistant release agent film than conventional release agents for use in processes for producing articles from polyurethane foam.

9 Claims, No Drawings

AQUEOUS RELEASE AGENT AND THE USE THEREOF

This is a continuation of application Ser. No. 07/711,884, filed on Jun. 7, 1991, which was abandoned upon the filing hereof.

The invention relates to an aqueous release agent which as release-active substances contains oil, fat, wax, fatty amines, esters of fatty acids with fatty alcohols and/or other conventional release-active substances emulsified in water as the carrier, as well as the use thereof.

In published EP-application 272 629 the prior art relating to processes for producing articles from polyurethane foam is discussed in detail. To avoid the disadvantages of the prior art an aqueous release-agent is proposed which as release-active substances contains oil and/or wax emulsified in water as the carrier and which is characterized in that it contains as a further release-active substance one or more aliphatic, primary, secondary and/or tertiary amines with at least one $C_{12}$ to $C_{24}$ alkyl radical, in which the further alkyl radicals in the case of secondary and tertiary amines can be $C_1$-$C_{24}$ alkyl radicals, and that it contains as an emulsifier for the amine or amines one or more ammonium salts with the formula $[NR_1R_2R_3R_4]^+X^-$, in which $R_1$, $R_2$, $R_3$ and $R_4$, independently of one another, stand for hydrogen or $C_1$-$C_{24}$ alkyl radicals, provided that at least one of the radicals $R_1$, $R_2$, $R_3$ and $R_4$ is a $C_1$-$C_{24}$ alkyl radical, and $X^-$ stands for an anion. A special feature of the release agent is that it is a so-called cationic emulsion, while hitherto only release agents in form of anionic emulsions were known. A special advantage of this release agent is the minimal formation of release compound residues (build-up) after mold removal.

Furthermore a process for producing articles from polyurethane foam is known from published European patent application 223 233 in which a solvent-free, aqueous release agent is used in combination with one or more alkali and/or ammonium salts of higher $C_{18}$ $C_{30}$-fatty acids and one or more higher $C_4$ $C_{26}$-alcohols and in which this combination is applied to the mold surface in the hot state. This process and the aqueous release agent used therein, which is an anionic emulsion, are an alternative to the above discussed release agent according to European patent application 272 629 for avoiding the reported disadvantages of the prior art.

However, in practice it has been found that the emulsifiers used in the two above discussed release agents are not yet completely satisfactory. Either they are often too hard and brittle and thus lead to build-up during PU foaming or they are very soft which can have the result that they are dissolved and removed in the injection area.

Thus, the problem of the invention is to propose a novel aqueous release agent of the aforementioned type which not only has the advantageous properties of the release agents known from European patent applications 272 629 and 223 233 but in addition avoids the above explained insufficiencies and leads to a flexible, highly elastic and pressure resistant release agent film on the surface of the mold used in processes for producing articles from polyurethane foam.

For solving this problem an aqueous release agent is proposed which contains as release-active substances oil, fat, wax, fatty amines and/or esters of fatty acids with fatty alcohols emulsified in water as the carrier and as emulsifier one or more ammonium salts of the formula $INR_1R_2R_3R_4]^+X^-$, in which $R_1$, $R_2$, $R_3$ and $R_4$, independently of one another, stand for hydrogen or substituted or non-substituted $C_1$-$C_{25}$ alkyl radicals, provided that at least one of $R_1$, $R_2$, $R_3$ and $R_4$ is a alkyl $C_1$-$C_{25}$ alkyl radical, and $X^-$ stands for an anion, and which is characterized in that it contains anions of $C_{10}$-$C_{30}$-surfactant acids.

In other words the invention relates to an aqueous release agent containing the above mentioned release-active substances emulsified in water as the carrier and as emulsifier a combination of a quaternary ammonium salt (cationic surfactant) with an anionic surfactant. Both portions (cationic and anionic) of the emulsifier combination can be employed as separate raw materials or can be formed by mutual reaction of corresponding raw materials.

Preferred embodiments of the inventive release agent and its use will be apparent from the subclaims and the following description.

The main feature of the release agent according to the present invention is the emulsifier system contained therein, which consists of a blend of neutralized cationic quaternary ammonium compounds with anionic soaps. It has been found completely surprisingly that despite the opposite charge of these two components the system does not flocculate but is capable to emulsify additional release-active substances.

With regard to the release-active substances (oil, fat, wax and fatty amines) contained in the release agent according to the present invention reference is made to European Patent Application 272 629. As disclosed therein the known aliphatic or aromatic, natural or synthetic oils can be used as release-active oils. The use of synthetic oil, which is 1,4-cis-polybutadiene, has been found to be preferable.

As fats the conventional lubricants and slip agents available in trade on the basis of natural or synthetic products can be used, which may include mineral or organic thickeners. As an example petrolatum may be mentioned. As wax the conventional saturated or unsaturated, natural or functional waxes can be used which are known as wax components f or PU release agents. Suitable examples are polyethylene, polypropylene, polybutine, polybutadiene and beeswax, as well as ester waxes and amide waxes with melting points of 30 to 145° C. Another example are ethoxylated long chain fatty alcohols like $C_{50}$ fatty alcohol ethoxylated with 3 moles of ethylene oxide.

The fatty amines are hydrophobic amines with at least one $C_{12}$-$C_{24}$ alkyl radical (cf. e.g. Hoechst brochure E Hoe. 4200 "Fettamine und Folgeproduktell", pages 6 and 7, to which reference is also made with regard to the nomenclature of the fatty amines). As suitable hydrophobic amines with release activity aliphatic primary, secondary and/or tertiary amines with radicals including at least one $C_{12}$-$C_{24}$ alkyl radical can be used. In the case of the secondary and tertiary amines, the second and third alkyl radical can be of a shorter chain in nature, so that apart from at least one $C_{12}$-$C_{24}$ alkyl radical said amines can also have one or two $C_1$-$C_{24}$ alkyl radicals. Even though non-functional linear amines are preferred, functional amines like amine ethoxylates may also be used. Of course, in practice often mixtures of amines, like especially cocoamines, are used which are composed of the suitable amines according to the invention and especially the aforementioned amines. Preferred are particularly stearylamine, distearylamine, methyldistearylamine, oleylamine and tetradecylamine or the aforementioned mixtures of these compounds corresponding to the natural sources.

Further useful release active substances are esters of fatty acids with fatty alcohols of $C_{10}$ to $C_{24}$ fatty acids and $C_{10}$ to $C_{24}$ fatty alcohols, particularly $C_{16}$ to $C_{18}$ fatty acids and $C_{16}$ to $C_{18}$ fatty alcohols. These substances can be compared to the release active waxes but are usually liquid. For the sake of brevity, these release active substances are referred to as esters of fatty acids with fatty alcohols throughout the specification and the claims.

With regard to the ammonium salt emulsifier (cation A) reference is also made to the disclosure in European Patent Application 272 629. Accordingly the emulsifier is preferably the ammonium salt corresponding to the release-active amine, but it is also possible to use ammonium salts differing from the amine. Generally suitable are ammonium salts with the general formula $NR_1R_2R_3R_4]^+X^-$, in which $R_1$, $R_2$, $R_3$ and $R_4$ and X have the above stated meaning. Preferably $R_1$ is a straight chain aliphatic hydrocarbon group of 12-24 carbon atoms and either (a) each group $R_2$-$R_4$ is an alkyl or hydroxyalkyl group of 1-6 carbon atoms or a benzyl group or (b) 2 or 3 of the groups $R_2$-$R_4$ form a heterocyclic radical with the nitrogen atom and each further group $R_2$-$R_4$ is an alkyl or hydroxyalkyl group of 1-6 carbon atoms or a benzyl group.

It is possible to use commercially available quaternary ammonium salts as well as ammonium salts formed during the reaction of the corresponding amines with hydrochloric, glycolic, citric, acetic, propionic or longer-chain $C_{12}$-$C_{24}$ fatty acids. Preferred emulsifiers are distearyldimethylammoniumchloride, trimethylstearylammoniumchloride, stearylammoniumchloride, methyldistearylammoniumchloride, cocoamineacetate as well as mixtures of these compounds.

The anion B of an anionic surfactant salt of the anionic emulsifier used according to the invention can be provided by a water soluble or water dispersible alkali and/or ammonium salt of an organic acid with a straight chain aliphatic hydrocarbon radical of 12-24 carbon atoms, particularly the sodium or potassium salt or a corresponding ammonium or substituted ammonium salt. On the other hand the anion B can be provided by the corresponding free organic acid. The polar organic group of the salt or the acid may be the carboxylate, sulfate or sulfonate ion and the anions providing compound may contain more than one such polar group. Examples for suitable organic acids which provide the anion are natural and synthetic aliphatic carboxylic acids of 12-24 carbon atoms, e.g. myristic, palmitic, stearic, oleic and behenic acid, particularly those from soaps as obtained by splitting triglyceride oils, e.g. tallow fatty acid which is a mixture of fatty acids consisting essentially of palmitic, stearic and linolic acid; alkylsulfuric acids of 12-24 carbon atoms, e.g. lauryl, cetyl and palmityl hydrogensulfates; alkane and olefin sulfonic acids with 12-24 carbon atoms, e.g. lauryl, myristyl, cetyl and stearyl sulfonic acid and particularly olefin sulfonates from the reaction of sulfur trioxide with linear α-olefins or from the reaction of alkanes with sulfur dioxide and sulfur chloride followed by hydrolysis or from the reaction of olefins with bisulfites; alkylether sulfuric acids from the reaction of molar amounts of alcohols with 12-24 carbon atoms with 1-15 moles ethylene oxide and subsequent reaction of the condensation products with sulfur trioxide; alkylbenzene sulfonic acids, the alkyl groups of which contain 12-24 carbon atoms, e.g. dodecylbenzene sulfonic acids; alkylsulfosuccinates, the alkyl groups of which have 6-24 and mostly 12-24 carbon atoms, from the reaction of maleic acid esters with bisulfites; acyloxysulfonic acids, e.g. acyloxyethyl- and 3-acyloxy-2-hydroxypropyl sulfonic acids, the acyl groups of which comprise 13-25 carbon atoms, e.g. lauroyloxyethyl and stearoylhydroxypropyl sulfonic acids; and a-carboxyalkyl sulfonic acids, the carboxyalkyl groups of which comprise 13-25 carbon atoms, e.g. sulfonated lauric and palmitic acids. Preferably the anion is an anion in which an alkyl or alkenyl group of 16-24 carbon atoms is present. The term "ammonium salt" relates to those neutralization products obtained by reacting surfactant acids in an aqueous environment with ammonia or amines like volatile bases, e.g. morpholine, methyl-aminopropanol, diethylaminoethanol etc., or non-volatile bases, e.g. monoethanolamine, triethanolamine, isopropanolamine, alpha,omega- and alpha,gamma-substituted diamines like ethylenediamine, 1,2-propylenediamine, 1,3-propylenediamine and 1,4-butylenediamine etc.

Surprisingly two water soluble components (amine/acid) form together in the aqueous emulsifying system (quats/soap) and are capable to emulsify additional release-active substances.

The release agent according to the invention is completely or at least essentially free from organic solvents. It can be prepared by combining all components and thorough mixing to form the desired emulsion. Alternatively, first an emulsion can be prepared in which the wax is emulsified with one or more anionic surfactants, the wax and the emulsifier preferably being present in amounts of about 6 and 2% by weight, respectively. Further, an emulsion is prepared which contains oil, fat and/or fatty amine and cationic emulsifier. The oil is present in this emulsion in an amount of preferably about 2 to 6% by weight while fatty amine and cationic emulsifier together amount to about 2% by weight. These two emulsions are then admixed in a weight ratio of 2:1 to 1:2. Preferably a little greater amount of the first mentioned emulsion is used. It has been found that this somewhat improves the stability of the final emulsion.

A further preparation alternative is to prepare first a cationic emulsion containing wax, oil, fat, esters of fatty acids with fatty alcohols and/or fatty amine under the addition of surfactant acid and to add a base subsequently to form the alkali and/or ammonium salt (s) of the surfactant acids (soap formation).

Another preparation alternative is to react the amine directly with higher acid to the emulsifier system of quaternary amine/acid anion.

In the release agent of the present invention wax, oil, fat, fatty amine and/or esters of fatty acids with fatty alcohols are usually present in an amount of 1-15% by weight and preferably 2-4% by weight. Anionic surfactant plus cationic ammonium salt emulsifier amount together to 2-6% by weight, preferably 1.5-2.5% by weight of the release agent. In this context it has to be observed that the normality ratio cation/anion ranges from 5:1 to 1:5 and preferably 2:1 to 1:3. As already mentioned above, it is preferred that the anionic emulsifier system is present in an excess over the ammonium salt since this leads to a better stability of the emulsion.

In three different practical applications of polyurethane foam systems it has been found that the inventive release agent provides a distinctly better mold removal than corresponding emulsions which only contain one or the other of the two emulsifier systems. Due to the inventive blending the release film exhibits completely surprising new properties like increased pressure resistance, decreased tendency of causing foam disorders, release efficiency and additional water repelling characteristics in the dried state.

Thus best mold removal has been found in the production of flexible integral foam (e.g. for spoilers). The quality of the foam surface corresponded approximately to those when using conventional release agents on the basis of organic solvents. When producing filter foam (e.g. air filters for automobiles) a positive result was only achieved with the inventive aqueous release agent, i.e. good mold removal was combined with good surface quality of the foam. In the production of articles of cold flexible foam (e.g. seat cushions, headrests, seats) equal or better results were obtained with regard to mold removal and quality of foam surface in comparison to known aqueous release agents. A great advantage in comparison to conventional aqueous release agents was, however, that the articles produced from cold flexible foam turned out to be self-extinguishing in the flammability test. This obviously is a very important property in automobile construction which could not be achieved with hitherto known release agents. In addition the surfaces of the articles produced from cold flexible foam exhibited good sealability with textiles or films and good properties with regard to surface tackiness.

We claim:

1. An aqueous release agent consisting essentially of:
   a) at least one of oil, wax, fat, fatty amines, and esters of fatty acids with fatty alcohols, as release-active substances, emulsified in water which acts as a carrier; and
   b) one or more ammonium salts of the formula $[NR_1R_2R_3R_4]^+X^-$, as an emulsifier
   wherein $R_1$, $R_2$, $R_3$, and $R_4$, independently, represent hydrogen or $C_1$–$C_{25}$ alkyl radicals, provided that at least one of the radicals is a $C_1$–$C_{25}$ alkyl radical, and
   wherein $X^-$ represents an anion which contains at least one higher $C_{10}$–$C_{30}$ surfactant acid.

2. A release agent according to claim 1, in which the anion(s) of higher $C_{10}$–$C_{30}$ surfactant acids are provided by corresponding alkali and/or ammonium salts.

3. A release agent according to claim 1, which contains 1 to 15% by weight of wax, oil, fat, fatty amine and/or esters of fatty acids with fatty alcohols.

4. Release agent according to claim 1, which contains 2 to 4% by weight of wax, oil, fat, fatty amine and/or esters of fatty acids with fatty alcohols.

5. Release agent according to claim 1, which contains anionic surfactant plus cationic ammonium salt emulsifier together in an amount of 2 to 6% by weight.

6. Release agent according to claim 1, which contains anionic surfactant plus cationic ammonium salt emulsifier together in an amount of 1.5 to 2.5% by weight.

7. Release agent according to claim 1, in which the ratio of cation of ammonium salt emulsifier to anion of anionic surfactant is 5:1 to 1:5.

8. Release agent according to claim 1, in which the ratio of cation of ammonium salt emulsifier to anion of anionic surfactant is 2:1 to 1:3.

9. Release agent according to claim 1, in which said oil is 1,4-cis-polybutadiene.

* * * * *